June 5, 1934. W. L. DE BAUFRE 1,961,201
PROCESS FOR SEPARATING MIXED GASES BY LIQUEFACTION
Filed March 2, 1932
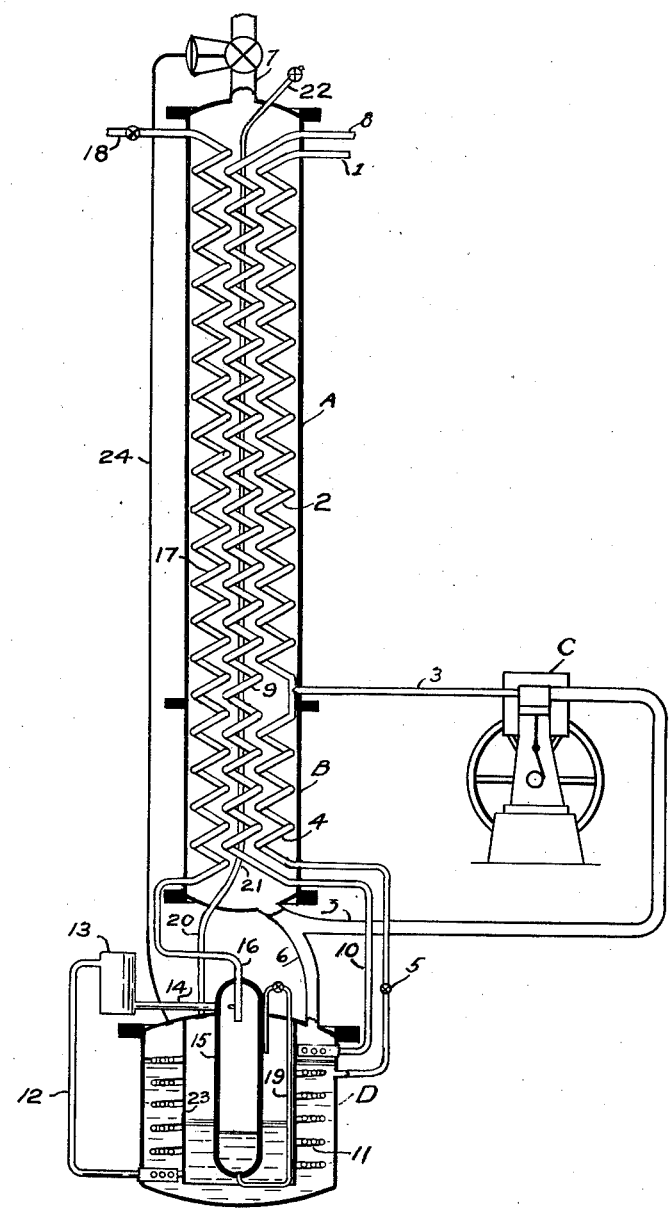
Wm. L. De Baufre
INVENTOR Patented June 5, 1934

1,961,201

UNITED STATES PATENT OFFICE 1,961,201

PROCESS FOR SEPARATING MIXED GASES BY LIQUEFACTION

William Lane De Baufre, Lincoln, Nebr.

Application March 2, 1932, Serial No. 596,289

11 Claims. (Cl. 62—175.5)

This invention relates to improvements in the art of separating mixed gases and is especially useful in the purification of helium containing nitrogen, oxygen and other gases having much higher boiling points than helium.

One of the primary objects of the invention is to secure helium of a higher purity than has heretofore beeen obtained by the liquefaction process.

A further object of the invention is to improve the efficiency of the process and thereby reduce the power requirements to a minimum.

Another object of the invention is to increase the recovery of helium and reduce the possible loss of helium to a minimum.

The above objects together with such other advantages as may hereinafter appear or are incident to the invention, are accomplished by a process which may be carried out in apparatus illustrated diagrammatically in the accompanying drawing which is a diagrammatic elevation partly in section of the principal parts of the apparatus.

In the process heretofore used for purifying helium, the impure helium is first compressed to a pressure of say 2000 lbs. per sq. in. and then cooled approximately to the temperature of liquid air boiling under a pressure somewhat above atmospheric pressure, say 1.5 atmospheres absolute. The corresponding temperature is about 82.5° Kelvin. More or less of the impurities are liquefied and some of the gaseous helium is absorbed by the liquid separated therefrom. The liquefied impurities are withdrawn and throttled to a pressure somewhat above atmospheric pressure. Most of the absorbed helium gas is set free and some of the impurities are evaporated by throttling, and the mixed gas and vapor is recovered to prevent a large loss of helium. The remaining liquefied impurities containing a small amount of absorbed helium, are then evaporated and discharged from the system. In order to supply the liquid air for cooling the compressed impure helium, a separate air liquefaction cycle has been provided.

The impurities in helium are mainly nitrogen and methane when first separated from natural gas, but are mainly nitrogen and oxygen after using the helium in an airship. If the impure helium is reduced to 82.5° Kelvin under say 2000 lbs. per sq. in. absolute pressure, most of the methane or oxygen will be liquefied and the impurity remaining in the helium will be nearly pure nitrogen. The saturated vapor pressure of nitrogen is about 26.6 lbs. per sq. in. absolute at 82.5° Kelvin. Therefore, the maximum possible purity of helium cooled to this temperature is (2000—26.6)/2000=98.7 per cent. This purity, however, has not been reached heretofore partly by reason of a mist of liquid impurities remaining in the purified helium gas and partly because the impure helium has not been cooled to the temperature of the bath of liquid air.

The improved process herein described produces helium of a purity of 99.5 per cent. by reason of the reduction of the impure helium to a lower temperature than heretofore reached and by reason of a more nearly perfect separation of the mist of liquid impurities from the purified helium than heretofore accomplished. Thus, by means to be described later, if the temperature of the helium and impurities is reduced to 75° Kelvin, the saturated vapor pressure of the nitrogen impurity remaining in the purified helium will be about 10 lbs. per sq. in. absolute and the purity of the purified helium will be (2000— 10)/2000=99.5 per cent. if no entrained liquid remains therein. As this purity of helium has been attained over long operating periods, the mist of impurities must have been very effectively removed and this very low temperature actually reached by the process now to be described.

Referring to the drawing, the single figure of which illustrates diagrammatically an apparatus suitable for carrying out the process, the process is carried out by means of an interchanger A, a liquefier B, an expansion engine C, a purifier D and the usual compressors, etc., used in such a process. The impure helium to be purified is first compressed to 1500 to 3000 lbs. per sq. in., dried and all traces of carbon dioxide removed in apparatus not shown. It is then introduced into pipe 8. From thence the impure helium flows down through coils 9 in interchanger A and liquefier B wherein it is cooled to say 100° Kelvin when it is conveyed by pipe 10 to coils 11 immersed in the liquid within the outer compartment of purifier D. In coils 11, the impure helium is cooled to about 75° Kelvin and then leaves through pipe 12.

At this very low temperature, most of the impurities are liquefied as explained above and a portion exists as mist which is difficult to separate from the helium gas. In order to aid in precipitating this mist by first concentrating it into liquid drops, the impure helium is passed through mist collector 13. The mist collector 13 contains a number of layers of fine mesh wire screen, thus exposing a large amount of surface to be wetted by the mist. In passing through mist collector 13 at reduced velocity due to its enlarged cross-section, most of the mist is collected into liquid drops by impinging upon the wetted surface. The impure helium leaves the mist collector through pipe 14 with most of the impurities concentrated into liquid drops.

Pipe 14 enters purifier flask 15 tangentially so that the gas, liquid drops and remaining mist are given a whirling motion. The resulting centrifugal forces cause the dense liquid drops and remaining mist to fly out to the periphery of the whirling gas where the liquid adheres to the inside surface of the flask and flows to the bottom of the flask.

The purified helium leaves flask 15 through the central tube 16 and returns through coils 17 in liquefier B and interchanger A where it is warmed to about atmospheric temperature before it leaves through pipe 18 containing a valve for controlling the pressure within the helium purification cycle just described.

The liquefied impurities collected in the bottom of flask 15 are withdrawn through pipe 19 containing a throttle valve which is operated to withdraw the impurities as rapidly as they accumulate. These liquid impurities contain absorbed helium gas which is largely released when the pressure is reduced from say 2000 lbs. per sq. in. within flask 15 to say 22 lbs. per sq. in. absolute in the space surrounding the flask. There will also be some evaporation of the liquid impurities by reason of the throttling action. Consequently, in the space above the liquid will accumulate a mixture of helium gas and saturated vapor of the impurities from the impure helium.

The helium acts as a gas while the saturated vapor of the impurities is in phase equilibrium with the liquid containing the same substances. The temperature of the liquid is determined by the partial pressure of the saturated vapor with which it is in phase equilibrium rather than the total pressure above the liquid. If the partial pressure of the helium gas is somewhat more than one-half the total pressure, the partial pressure of the saturated vapor in phase equilibrium with the liquid will be somewhat less than one-half the total pressure. Thus, for a total pressure of say 22 lbs. per sq. in. absolute, the partial pressure of the saturated vapor may be 10 lbs. per sq. in. absolute or less and the corresponding temperature of the liquefied impurities in phase equilibrium with the saturated vapor may be less than 75° Kelvin.

The mixture of absorbed helium gas released and impurities vaporized by throttling the liquefied impurities from flask 15, is withdrawn through pipe 20 from the space surrounding the flask as the mixture accumulates therein. This recovered helium is returned through coils 21 within liquefier B and interchanger A and discharged through pipe 22 containing the valve shown.

The unevaporated liquid impurities maintain the lower portion of the flask at the lowest temperature in the system and thus completely protect the liquid within the flask from being vaporized by any heat leak into the flask from the surroundings. Consequently, the liquefied impurities separated from the helium within the flask are kept quiescent, which is an essential condition to the satisfactory operation of such a separating device. Also, there is no tendency to reintroduce any of the separated liquefied impurities into the purified helium by partly vaporizing the impurities within the flask by heat leaking in from the outside.

From the space surrounding flask 15 the liquefied impurities pass down under partition 23 and rise around the coils in the outer compartment of purifier D. The motion of this cold liquid is thus in counterflow to the impure helium flowing down through the coils immersed therein. Consequently, the impure helium is cooled nearly to the very low temperature of these throttled liquefied impurities. In passing up over the coils, the temperature of the liquefied impurities rises until it reaches the boiling point under the pressure in this outer compartment. The liquid is then vaporized by heat transfer from the warmer impure helium within coils 11 and the vapor leaves the outer compartment through pipe 6 and passes up through liquefier B and interchanger A over the various coils therein, finally leaving through pipe 7.

It should be noted that in the inner compartment immediately surrounding the flask, no heating coils are placed. And as this inner compartment is largely protected from heat leak from the surroundings by the outer compartment, substantially no vaporization of liquid occurs in the inner compartment except that due to throttling. Consequently, the liquid in the inner compartment is reduced to the lowest possible temperature because the space above this liquid contains substantially the minimum amount of saturated vapor relative to the amount of absorbed helium released by throttling from the pressure within flask 15 to the lower pressure in the inner compartment surrounding the flask.

To balance heat leak into the system and other refrigeration requirements, a refrigeration cycle is provided with air, nitrogen or other suitable gas as the working medium. This air is compressed to say 500 lbs. per sq. in., dried and all traces of carbon dioxide removed in apparatus not shown. It is then introduced into pipe 1. This compressed air passes down through coils 2 in interchanger A from which all or a major portion passes through expansion engine C and pipe 3 to the lower end of liquefier B. Here the air cooled by expansion in engine C joins the vaporized liquid impurities from purifier D and the commingled air and impurities return through both liquefier B and interchanger A.

A portion of the compressed air is liquefied in coils 4 in liquefier B. At starting and whenever there is a deficiency of liquid in purifier D, valve 5 may be opened to discharge some of this liquid air into the outer compartment of purifier D. This liquid air enters near the surface of the liquid in the outer compartment of purifier D in order not to mix the liquid air with the colder liquid impurities near the bottom of purifier D. Consequently, the impure helium is finally cooled by liquefied impurities reduced as above described to the lowest possible temperature, after the impure helium has been cooled by the liquid air from the refrigeration cycle at a higher temperature than that of the impurities.

The commingled liquid air from the refrigeration cycle and liquefied impurities separated from the impure helium are vaporized in the outer compartment of purifier D and from thence return through pipe 6 to liquefier B. Here the vaporized liquids commingle with the exhaust air from expansion engine C entering through pipe 3. The commingled air from the refrigeration cycle and impurities separated from the impure helium pass over the several coils in liquefier B and interchanger A, thereby cooling from about atmospheric temperature the impure helium entering pipe 8 and the compressed air entering pipe 1. The purified helium returning through coils 17 is warmed nearly to atmospheric temeprature by heat transfer from the commingled air and impurities. The recovered helium from the inner compartment of purifier D is likewise warmed nearly to room temperature in coils 21 by heat transfer from the commingled air and impurities.

The commingled air and impurities leave interchanger A through pipe 7 containing the automatic control valve shown in the drawing. From the control chamber of this valve, a tube 24 extends to the outer compartment of purifier D. The flow of commingled air and impurities is thereby automatically controlled to maintain a substantially constant pressure above the liquid in the outer compartment of purifier D. This enables the flow of recovered helium from the inner compartment of purifier D to be easily controlled by the hand operated valve on pipe 22.

I claim:

1. The process of separating mixed gases which includes cooling the mixed gases until a portion is liquefied, separating the liquefied portion from the remaining gaseous portion, utilizing the separated liquefied portion to cool the mixed gases, cooling a gaseous refrigerant until it is partly liquefied, mixing the liquefied refrigerant with the separated liquefied portion of the mixed gases remaining after this separated liquefied portion has been utilized to cool the mixed gases, and then utilizing the resulting mixture to cool the said mixed gases.

2. The process of separating gaseous impurities from impure helium which includes cooling the impure helium until the gaseous impurities are liquefied, separating the liquefied impurities from the helium gas, utilizing the separated liquefied impurities to cool the impure helium, cooling a compressed gaseous refrigerant until it is partly liquefied, commingling the liquefied gaseous refrigerant with the separated liquefied impurities which have been utilized to cool the impure helium, and then utilizing the commingled refrigerant and impurities to cool the impure helium.

3. The process of separating gaseous impurities from impure helium which includes compressing the impure helium gas, cooling the compressed impure helium gas until the impurities are liquefied and contain by absorption some of the helium gas, separating the liquefied impurities from the unabsorbed purified helium gas, warming the purified helium gas, throttling the separated liquefied impurities to a reduced pressure exerted by the absorbed helium gas released and the liquid evaporated by throttling only, withdrawing and warming the absorbed helium gas released and the liquid evaporated by throttling, withdrawing the remaining liquefied impurities and evaporating them under a pressure substantially equal to the said reduced pressure, compressing a gaseous refrigerant, cooling the compressed refrigerant, expanding the cooled refrigerant to a pressure substantially equal to the said reduced pressure, commingling the expanded refrigerant and the evaporated liquid impurities, utilizing the resultant mixture to cool the impure helium gas, warm the purified helium gas, warm the absorbed helium gas released and the liquid evaporated by throttling, and cool the compressed refrigerant by heat interchange with each, and maintaining the said reduced pressure nearly constant by controlling the flow of the said resulting mixture.

4. The process of separating gaseous impurities from impure helium gas which includes compressing the impure helium gas to a pressure of 1500 to 3000 lbs. per sq. in., cooling the compressed impure helium gas until the impurities are liquefied and contain by absorption some of the helium gas, separating the liquefied impurities from the unabsorbed purified helium gas, warming the purified helium gas, throttling the separated liquefied impurities to a reduced pressure exerted by the absorbed helium gas released and the liquid evaporated by throttling only, withdrawing and warming the absorbed helium gas released and the liquid evaporated by throttling, withdrawing the remaining liquefied impurities and evaporating them under a pressure substantially equal to the said reduced pressure, compressing atmospheric air and cooling it nearly to the temperature of liquefaction, withdrawing a portion of the cooled air and expanding it through an engine to a pressure substantially equal to the said reduced pressure, cooling and liquefying the remaining portion of the cooled air and throttling it to substantially the same reduced pressure, commingling the expanded gaseous air, the throttled liquid air and the evaporated liquid impurities, utilizing the resulting mixture to cool the impure helium gas, warm the purified helium gas, warm the absorbed helium gas relased and the liquid evaporated by throttling, and cool and partly liquefy the compresed air by heat interchange with each, and maintaining the said reduced pressure nearly constant by controlling the flow of the said resulting mixture.

5. The process of separating mixed gases which includes cooling the mixed gases under a high pressure until a portion is liquefied and contains by absorption some of the remaining gaseous portion, separating the liquefied portion from the unabsorbed gaseous portion, throttling the liquefied portion to a reduced pressure whereby absorbed gas is released, some of the liquefied portion is vaporized and the remaining liquid is reduced to a temperature corresponding to the partial saturated vapor pressure of the vaporized liquid, withdrawing the absorbed gas released and the liquid vaporized by throttling, withdrawing the remaining liquid and utilizing it at a pressure higher than said partial saturated vapor pressure to cool the mixed gases by countercurrent heat interchange therewith whereby said remaining liquid is first raised in temperature to its boiling point at said higher pressure and then vaporized under its saturated vapor pressure and the mixed gases are cooled in imparting first the latent heat of vaporization and finally the sensible heat to said remaining liquid.

6. The process of claim 5 wherein the said remaining liquid while subjected to the pressure of the absorbed gases released and the liquid evaporated by throttling is utilized for protecting from vaporization the liquefied portion of the cooled mixed gases before throttling this liquefied portion to the said reduced pressure.

7. The process of claim 5 wherein the said remaining liquid after being withdrawn is utilized for protecting from vaporization the throttled liquefied portion of the mixed gases while the said liquefied portion is subjected to the pressure exerted by the absorbed gases released and the liquid evaporated by throttling.

8. The process of separating mixed gases which includes cooling the mixed gases under a high pressure until a portion is liquefied and contains by absorption some of the remaining gaseous portion, separating the liquefied portion from the unabsorbed gaseous portion, throttling the liquefied portion to a reduced pressure whereby absorbed gases are released and some of the liquefied portion is vaporized, withdrawing the absorbed gases released and the liquid vaporized by throttling, withdrawing the remaining liquid, utilizing the remaining liquid at a pressure substantially equal to the reduced total pressure of the throttled mixture but higher than the partial pressure of the liquid vaporized by throttling to cool the mixed gases by countercurrent heat interchange therewith, whereby said remaining liquid is first warmed to its boiling point at said higher pressure and then vaporized and the mixed gases are cooled in imparting first the latent heat of vaporization and finally the sensible heat to said remaining liquid.

9. The process of separating gaseous impurities from impure helium gas which includes cooling the impure helium gas under high pressure until the impurities are liquefied and contain by absorption some of the helium gas, separating the liquefied impurities from the unabsorbed gas, throttling the liquefied impurities to a reduced pressure less than 30 lbs. per sq. in. gage whereby absorbed helium gas is released and some of the liquefied impurities are vaporized, withdrawing the helium gas released and the impurities vaporized by throttling, withdrawing the remaining liquefied impurities, utilizing said remaining liquefield impurities at a pressure substantially equal to the reduced total pressure of the throttled mixture but higher than the partial pressure of the liquefied impurities therein to cool the impure helium gas by countercurrent heat interchange therewith whereby said remaining liquefied impurities are first warmed to their boiling point at said higher pressure and then vaporized and the impure helium gas is cooled in imparting first the latent heat of vaporization and finally the sensible heat to said remaining liquefied impurities.

10. The process of separating gaseous impurities from impure helium gas which includes compressing the impure helium gas, cooling the compressed impure helium gas until the impurities are liquefied and contain by absorption some of the helium gas, separating the liquefied impurities from the unabsorbed purified helium gas, warming the purified helium gas, throttling the separated liquefied impurities to a reduced pressure, withdrawing and warming the absorbed helium gas released and the liquid evaporated by throttling, withdrawing and evaporating the remaining liquefied impurities, compressing a gaseous refrigerant, cooling the compressed refrigerant, reducing the cooled refrigerant to a lower pressure, commingling the cooled refrigerant under the lower pressure with the evaporated impurities, and utilizing the resultant mixture to cool the impure helium gas, to warm the purified helium gas, to warm the absorbed helium gas released and the liquid evaporated by throttling, and to cool the compressed refrigerant by heat interchange with each.

11. The process of separating mixed gases which includes cooling the mixed gases until a portion is liquefied by selective liquefaction, separating the liquefied portion from the remaining gaseous portion, cooling a compressed gaseous refrigerant, withdrawing a portion thereof and expanding it with external work, further cooling and liquefying the remaining portion of gaseous refrigerant, evaporating the liquefied portion of the mixed gases and the liquefied portion of the refrigerant by heat interchange with the mixed gases, commingling the resulting vapor with the expanded gaseous refrigerant and utilizing the commingled gases to cool the mixed gases and the compressed gaseous refrigerant by heat interchange with each and to warm the separated gaseous portion of the mixed gases by imparting thereto some of the heat received from the mixed gases and the compressed gaseous refrigerant.

WILLIAM LANE DE BAUFRE.